United States Patent
Kato et al.

(10) Patent No.: US 9,805,861 B2
(45) Date of Patent: Oct. 31, 2017

(54) COMMUNICATION TERMINAL INCLUDING CLOSE-PROXIMITY COMMUNICATION COIL, POWER TRANSMISSION COIL, AND METAL PLATE

(71) Applicant: Murata Manufacturing Co., Ltd., Nagaokakyo-shi, Kyoto-fu (JP)

(72) Inventors: Noboru Kato, Nagaokakyo (JP); Masahiro Ozawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 432 days.

(21) Appl. No.: 14/551,406

(22) Filed: Nov. 24, 2014

(65) Prior Publication Data

US 2015/0076922 A1 Mar. 19, 2015

Related U.S. Application Data

(63) Continuation of application No. PCT/JP2014/052024, filed on Jan. 30, 2014.

(30) Foreign Application Priority Data

Apr. 8, 2013 (JP) .................. 2013-080258

(51) Int. Cl.
 *H01F 27/36* (2006.01)
 *H01Q 1/24* (2006.01)
 (Continued)

(52) U.S. Cl.
 CPC ............ *H01F 27/36* (2013.01); *H01F 27/28* (2013.01); *H01F 38/14* (2013.01); *H01Q 1/243* (2013.01);
 (Continued)

(58) Field of Classification Search
 CPC H01F 27/36; H01F 38/14; H02J 17/00; H02J 5/005; H02J 50/90; H02J 7/025; G01R 33/07; G01R 33/072
 See application file for complete search history.

(56) References Cited

U.S. PATENT DOCUMENTS 8,269,375 B2 * 9/2012 Sogabe .................. H01F 38/14
 307/104
2011/0025265 A1 2/2011 Mochida et al.
 (Continued)

FOREIGN PATENT DOCUMENTS

JP 2008-206297 A 9/2008
JP 2009-247124 A 10/2009
 (Continued)

OTHER PUBLICATIONS

Official Communication issued in International Patent Application No. PCT/JP2014/052024, dated Apr. 22, 2014.

*Primary Examiner* — Hai L Nguyen
(74) *Attorney, Agent, or Firm* — Keating & Bennett, LLP

(57) ABSTRACT

A communication terminal includes a close-proximity communication coil, a power transmission coil, and a metal plate. The close-proximity communication coil is configured to be used in a close-proximity communication system. The power transmission coil is configured to be used in a contactless power transmission system. At least a portion of the metal plate is disposed between the close-proximity communication coil and the power transmission coil. The close-proximity communication coil and the power transmission coil are disposed in non-overlapping locations when viewed from a direction perpendicular or substantially perpendicular to a main surface of the metal plate. At least one of the close-proximity communication coil and the power transmission coil electromagnetically couples with the metal plate.

20 Claims, 8 Drawing Sheets

(51) Int. Cl.
*H01Q 7/00* (2006.01)
*H01Q 21/28* (2006.01)
*H01F 27/28* (2006.01)
*H02J 5/00* (2016.01)
*H04W 4/00* (2009.01)
*H04B 5/00* (2006.01)
*H01F 38/14* (2006.01)
*H04M 1/02* (2006.01)
*H02J 7/00* (2006.01)
*H02J 7/02* (2016.01)

(52) U.S. Cl.
CPC ............... *H01Q 1/248* (2013.01); *H01Q 7/00* (2013.01); *H01Q 21/28* (2013.01); *H02J 5/005* (2013.01); *H04B 5/0031* (2013.01); *H04B 5/0037* (2013.01); *H04B 5/0081* (2013.01); *H04B 5/0087* (2013.01); *H04W 4/008* (2013.01); *H02J 7/0042* (2013.01); *H02J 7/025* (2013.01); *H04M 1/0202* (2013.01)

(56) References Cited

U.S. PATENT DOCUMENTS

| | | |
|---|---|---|
| 2011/0050535 A1 | 3/2011 | Yamaguchi et al. |
| 2012/0187903 A1 | 7/2012 | Tabata et al. |

FOREIGN PATENT DOCUMENTS

| | | |
|---|---|---|
| JP | 2011-049936 A | 3/2011 |
| WO | 2012/172812 A1 | 12/2012 |

\* cited by examiner

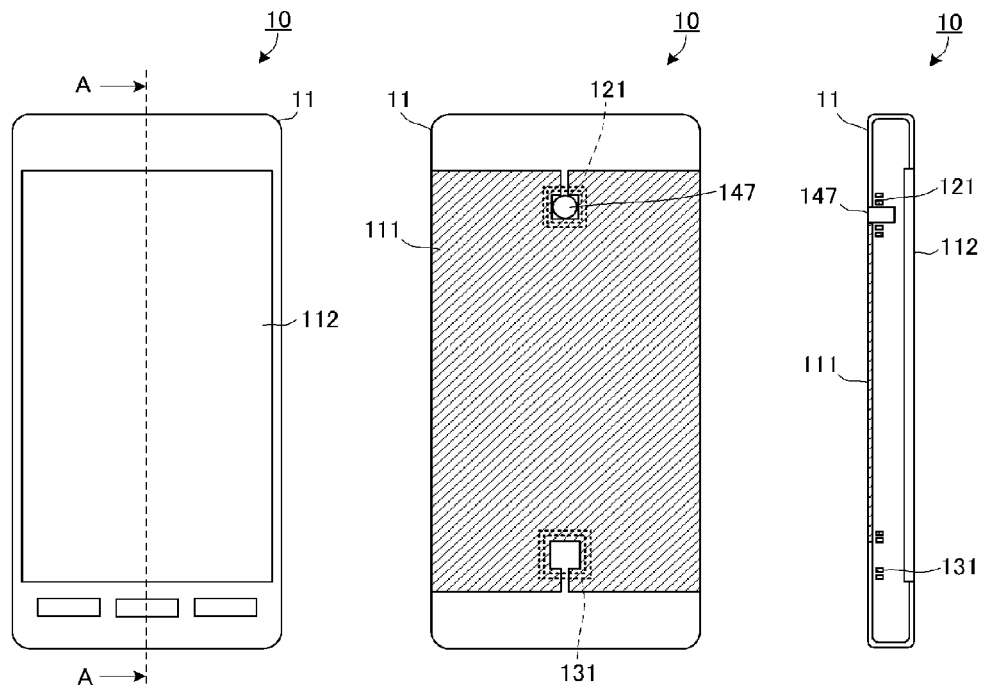
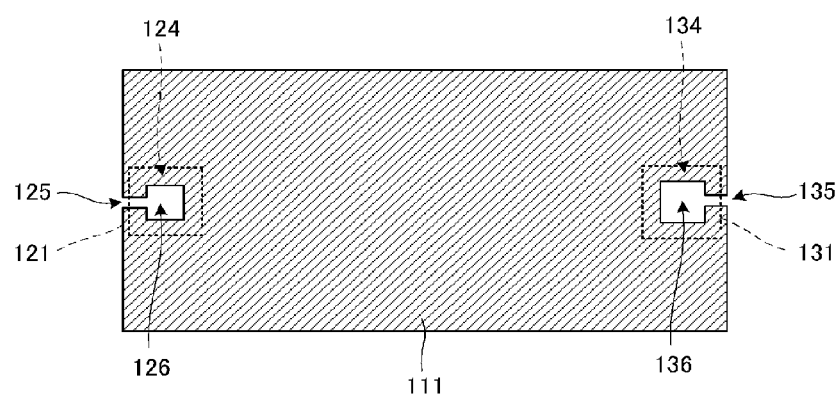

COMMUNICATION TERMINAL INCLUDING CLOSE-PROXIMITY COMMUNICATION COIL, POWER TRANSMISSION COIL, AND METAL PLATE

BACKGROUND OF THE INVENTION

1. Field of the Invention

The present invention relates to communication terminals provided with close-proximity communication systems and contactless power transmission systems.

2. Description of the Related Art

NFC (Near-Field Communication), RFID (Radio Frequency Identification), and such systems are examples of close-proximity communication systems. The RFID system is a close-proximity communication system that uses magnetic coupling between a R/W-side coil and a tag-side coil, and is used for monetary transactions, authentication, and the like.

Qi (registered trademark), meanwhile, is a power transmission system that uses magnetic coupling, serving as an example of a contactless power transmission system. This power transmission system can transmit power without contact, using magnetic coupling between a power transmitting apparatus-side coil and a communication terminal-side coil.

Japanese Unexamined Patent Application Publication No. 2009-247124 discloses a communication terminal provided with a close-proximity communication system and a contactless power transmission system.

Extensive space cannot be secured within the housing of a small-sized communication terminal, and as a result, it is impossible to avoid disposing a coil for close-proximity communication and a coil for power transmission near each other. There is thus a risk that the coil for close-proximity communication and the coil for power transmission will magnetically couple during close-proximity communication or during power transmission. In such a case, the resonant frequency of the close-proximity communication circuit or the power transmission circuit will change, resulting in a problem that desired electrical characteristics cannot be obtained for the communication terminal.

SUMMARY OF THE INVENTION

Preferred embodiments of the present invention provide a communication terminal having stable electrical characteristics.

A communication terminal according to a preferred embodiment of the present invention includes a close-proximity communication coil configured to be used in a close-proximity communication system, a power transmission coil configured to be used in a contactless power transmission system, and a metal plate. At least a portion of the metal plate is disposed between the close-proximity communication coil and the power transmission coil, the close-proximity communication coil and the power transmission coil are disposed in non-overlapping locations when viewed from a direction perpendicular or substantially perpendicular to a main surface of the metal plate, and at least one of the close-proximity communication coil and the power transmission coil electromagnetically couples with the metal plate.

According to this configuration, the metal plate defines and functions as a radiating element for at least one of the close-proximity communication system and the contactless power transmission system, and thus superior antenna characteristics are achieved. As such, the close-proximity communication coil and the power transmission coil are smaller than in the past. Accordingly, the distance between the close-proximity communication coil and the power transmission coil is increased. Meanwhile, at least a portion of the metal plate is disposed between the close-proximity communication coil and the power transmission coil. As such, the close-proximity communication coil and the power transmission coil experience almost no electromagnetic coupling. Accordingly, stable electrical characteristics are ensured during close-proximity communication and power transmission.

Preferably, the close-proximity communication coil and the power transmission coil are spaced from each other by no less than a coil radius of the close-proximity communication coil and no less than a coil radius of the power transmission coil, when viewed from a direction perpendicular or substantially perpendicular to a main surface of the metal plate.

According to this configuration, the close-proximity communication coil and the power transmission coil are prevented from magnetically coupling with certainty.

Preferably, the close-proximity communication coil and the power transmission coil are disposed in locations facing each other with a central portion of the metal plate located therebetween, when viewed from a direction perpendicular or substantially perpendicular to a main surface of the metal plate.

According to this configuration, the close-proximity communication coil and the power transmission coil are prevented from electromagnetically coupling with even more certainty.

Preferably, a portion of the close-proximity communication coil overlaps with the metal plate when viewed from a direction perpendicular or substantially perpendicular to a main surface of the metal plate, and the close-proximity communication coil electromagnetically couples with the metal plate.

According to this configuration, the metal plate is configured to be used as a radiating element for the close-proximity communication system, and the communication range of the close-proximity communication system is increased.

Preferably, the metal plate includes a first slit portion, and a coil opening portion of the close-proximity communication coil overlaps with the first slit portion when viewed from a direction perpendicular or substantially perpendicular to a main surface of the metal plate.

According to this configuration, the coupling between the close-proximity communication coil and the metal plate are improved, which makes it possible to increase the communication range even more.

A portion of the power transmission coil preferably overlaps with the metal plate when viewed from a direction perpendicular or substantially perpendicular to a main surface of the metal plate, and the power transmission coil preferably electromagnetically couples with the metal plate.

According to this configuration, the metal plate is configured to be used as a radiating element (power supply element) for a contactless power transmission system, which makes it possible to improve the power transmission efficiency of the contactless power transmission system.

The metal plate preferably includes a second slit portion, and a coil opening portion of the power transmission coil preferably overlaps with the second slit portion when viewed from a direction perpendicular or substantially perpendicular to a main surface of the metal plate.

According to this configuration, the coupling between the power transmission coil and the metal plate is improved, which makes it possible to transmit power even more efficiently.

The metal plate preferably includes a loop portion, and the loop portion preferably configures the power transmission coil.

According to this configuration, the number of components is reduced. In addition, heat is efficiently dissipated through the metal plate during power transmission.

Preferably, the communication terminal further includes a housing that is partially configured of the metal plate.

According to this configuration, a portion of a metal housing is preferably used as the metal plate, and it is thus not necessary to secure additional space to dispose a separate metal plate. The metal plate preferably is also disposed across a wide surface area.

According to various preferred embodiments of the present invention, stable electrical characteristics are ensured during close-proximity communication and power transmission.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a plan view illustrating a front surface side of a communication terminal according to a first preferred embodiment of the present invention, FIG. 1B is a plan view illustrating a rear surface side of the communication terminal according to the first preferred embodiment of the present invention, and FIG. 1C is an A-A cross-sectional view illustrating the communication terminal according to the first preferred embodiment of the present invention.

FIG. 2 is a plan view illustrating a positional relationship among a metal plate 111, a close-proximity communication coil 121, and a power transmission coil 131.

DETAILED DESCRIPTION OF THE PREFERRED EMBODIMENTS

First Preferred Embodiment

Figure 3A:
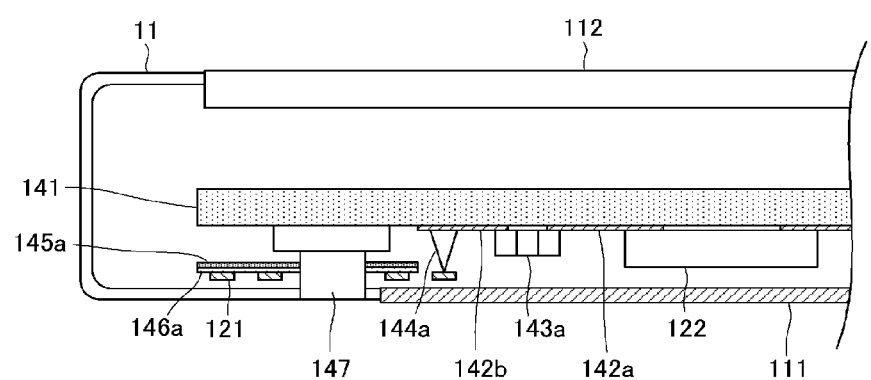
FIG. 3A is a diagram illustrating a close-proximity communication module in the communication terminal according to the first preferred embodiment of the present invention, showing primary components in an enlarged manner along an A-A cross-section.

A communication terminal according to a first preferred embodiment of the present invention will be described hereinafter. The communication terminal according to the present preferred embodiment preferably is a smartphone. However, the communication terminal may be a music player, a laptop PC, a tablet terminal, or the like provided with a communication function, for example. FIG. 1A is a plan view illustrating a front surface side of a communication terminal 10 according to a first preferred embodiment of the present invention. FIG. 1B is a plan view illustrating a rear surface side of the communication terminal 10. FIG. 1C is an A-A cross-sectional view illustrating the communication terminal 10. FIG. 2 is a plan view illustrating a positional relationship among a metal plate 111, a close-proximity communication coil 121, and a power transmission coil 131. However, note that FIG. 2 illustrates the number of turns in and the dimensions of each coil so that the positional relationship is clear.

The communication terminal 10 preferably has a parallelepiped or approximately parallelepiped outer shape, with a front surface and a rear surface (which are broader than the other surfaces). A rectangular or approximately rectangular plate-shaped metal plate 111 is provided on the rear surface side of the communication terminal 10. The metal plate 111 is disposed in a central region of the rear surface in the lengthwise direction thereof. The metal plate 111 preferably is configured of an aluminum alloy, a magnesium alloy, or the like, and partially configures a housing (main body) 11.

The metal plate 111 has a longer direction and a shorter direction. A slit portion (cutout portion) 125 is provided in a first end portion of the metal plate 111 in the longer direction thereof, and a slit portion (cutout portion) 135 is provided in a second end portion (on the opposite side as the first end portion) of the metal plate 111 in the longer direction thereof. The slit portion 125 corresponds to a first slit portion. The slit portion 135 corresponds to a second slit portion.

The slit portion 125 includes a metal opening portion 126. The metal opening portion 126 is formed preferably by increasing the width of the slit at a leading end portion of the slit portion 125. Likewise, the slit portion 135 includes a metal opening portion 136. The metal opening portion 136 is formed preferably by increasing the width of the slit at a leading end portion of the slit portion 135.

The close-proximity communication coil 121 is provided within the housing 11. The close-proximity communication coil 121 is configured to be used in a close-proximity communication system, which is HF (high-frequency) near-field communication, represented by NFC. The close-proximity communication coil 121 is configured preferably by forming a coil pattern of copper, aluminum, or the like on a thin, flexible board such as an FPC (flexible printed circuit), and is a spiral-shaped conductor in which the center of the winding serves as a coil opening portion 124. The close-proximity communication coil 121 is provided near the metal plate 111. The coil opening portion 124 is disposed so as to overlap with the metal opening portion 126 as viewed from above. The close-proximity communication coil 121 electromagnetically couples with the metal plate 111. Because the electromagnetic coupling according to various preferred embodiments of the present invention is achieved almost entirely through a magnetic field, electromagnetic coupling will simply be referred to as "magnetic coupling" hereinafter.

The power transmission coil 131 is provided within the housing 11. The power transmission coil 131 is preferably used in a contactless power transmission system using such as magnetic induction system, magnetic resonance system, or the like. The power transmission coil 131 is configured preferably by forming a coil pattern of copper, aluminum, or the like on a thin, flexible board such as an FPC, and is a spiral-shaped conductor in which the center of the winding serves as a coil opening portion 134. The power transmission coil 131 is provided near the metal plate 111. The coil opening portion 134 is disposed so as to overlap with the metal opening portion 136 as viewed from above. The power transmission coil 131 magnetically couples with the metal plate 111.

Note that the metal opening portion 136 is larger than the metal opening portion 126. Likewise, the coil opening portion 134 is larger than the coil opening portion 124. A conducting wire used in the power transmission coil 131 is thicker than a conducting wire used in the close-proximity communication coil 121. This makes it possible to transmit a greater amount of power with less loss during power transmission.

A display 112, various types of buttons, and so on are provided on the front surface side of the communication terminal 10. A camera module 147 is preferably provided on the rear surface side of the communication terminal 10, in the center of the winding of the close-proximity communication coil 121 (that is, in the coil opening portion 124). In other words, the metal opening portion 126 is used as a location where a camera lens is disposed.

FIG. 3A is a diagram illustrating the close-proximity communication module in communication terminal 10, showing primary components in an enlarged manner along an A-A cross-section. The A-A cross-section shown here is the same as in FIG. 1A.

A printed circuit board 141 is provided within the housing 11. The printed circuit board 141 is disposed so as to be parallel or substantially parallel to the metal plate 111. A flexible board 146a is provided between the printed circuit board 141 and the metal plate 111.

The close-proximity communication coil 121 is provided on a main surface of the flexible board 146a located toward the metal plate, and a magnetic sheet 145a configured of a ferrite is provided on another main surface of the flexible board 146a located toward the printed circuit board 141. The close-proximity communication coil 121 is provided toward the first end portion in the longer direction as viewed from the center of the terminal housing 11.

A close-proximity communication IC (NFC RFIC) 122, interconnects 142a and 142b, a capacitor chip 143a, a pin terminal 144a, and the camera module 147 are provided on the printed circuit board 141. The close-proximity communication IC 122, the interconnects 142a and 142b, the capacitor chip 143a, and the pin terminal 144a are disposed near the close-proximity communication coil 121 and are connected to the close-proximity communication coil 121.

The close-proximity communication IC 122 is configured to process high-frequency signals for close-proximity communication (NFC communication signals, in this case). The capacitor chip 143a and the close-proximity communication coil 121 configure an LC parallel resonant circuit. A resonant frequency of the LC parallel resonant circuit preferably is almost the same as the frequency used for the close-proximity communication (a carrier frequency). The magnetic sheet 145a is provided in order to significantly reduce or prevent unnecessary coupling between the close-proximity communication coil 121 and the conductor pattern provided on the printed circuit board 141.

Figure 3B:
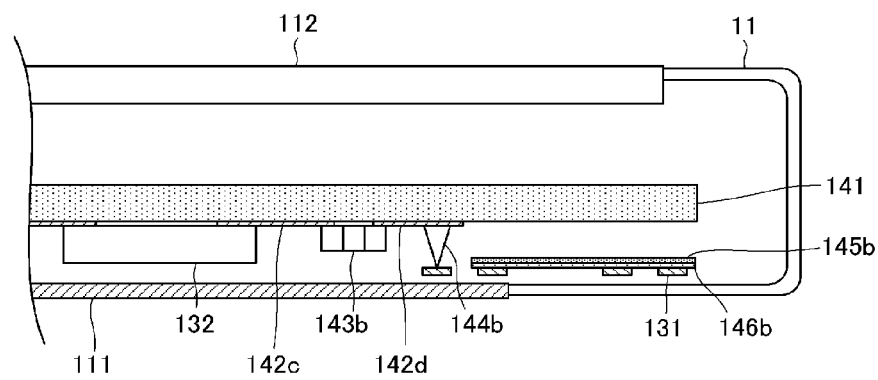
FIG. 3B is a diagram illustrating a power transmission module in the communication terminal according to the first preferred embodiment of the present invention, showing primary components in an enlarged manner along an A-A cross-section.

FIG. 3B is a diagram illustrating the power transmission module in the communication terminal 10, showing primary components in an enlarged manner along the A-A cross-section. The A-A cross-section shown here is the same as in FIG. 1A.

A flexible board 146b is provided between the printed circuit board 141 and the metal plate 111. The power transmission coil 131 is provided on a main surface of the flexible board 146b located toward the metal plate, and a magnetic sheet 145b configured of a ferrite is provided on another main surface of the flexible board 146b located toward the printed circuit board 141. The power transmission coil 131 is provided toward the second end portion in the longer direction as viewed from the center of the terminal housing 11 (that is, on the opposite side from where the close-proximity communication coil 121 is provided).

A power transmission IC 132, interconnects 142c and 142d, a capacitor chip 143b, and a pin terminal 144b are provided on the printed circuit board 141. These constituent elements are disposed near the power transmission coil 131 and are connected to the power transmission coil 131.

The power transmission IC 132 is configured to control the transmission of power. The capacitor chip 143b and the power transmission coil 131 configure an LC parallel resonant circuit. A resonant frequency of the LC parallel resonant circuit is almost the same as the frequency used for the power transmission (a carrier frequency). The magnetic sheet 145b is provided in order to significantly reduce or prevent unnecessary coupling between the power transmission coil 131 and the conductor pattern formed on the printed circuit board 141.

Figure 4A:
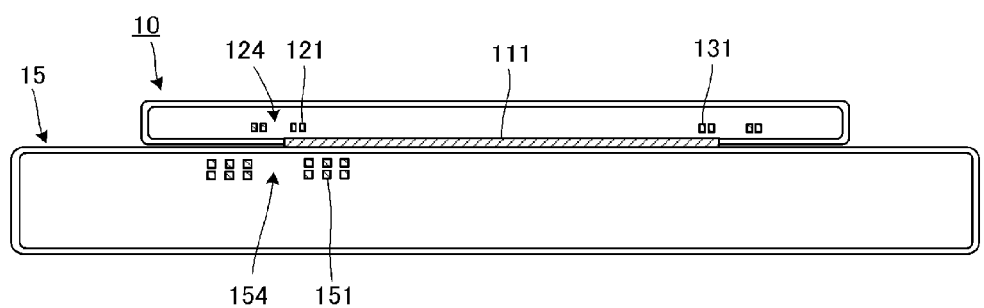
FIG. 4A is a cross-sectional view illustrating the communication terminal according to the first preferred embodiment of the present invention and a communication apparatus that communicates therewith.

FIG. 4A is a cross-sectional view illustrating the communication terminal 10 and a communication apparatus 15 that communicates therewith. The communication apparatus 15 includes a close-proximity communication coil 151. The close-proximity communication coil 151 preferably is a spiral-shaped conductor in which the center of the winding serves as a coil opening portion 154. The communication terminal 10 is disposed upon the communication apparatus 15 so that the coil opening portion 124 and the coil opening portion 154 overlap when viewed from above.

When a high-frequency current flows in the close-proximity communication coil 151, the close-proximity communication coils 121 and 151 and the metal plate 111 couple with each other via a magnetic field. The communication apparatus 15 and the communication terminal 10 communicate by modulating the magnetic field.

Figure 4B:
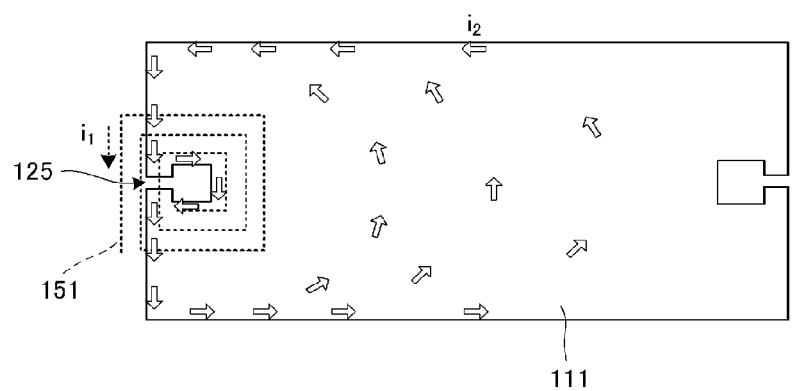
FIG. 4B is a plan view illustrating current flowing through a close-proximity communication coil 151 and the metal plate 111.

FIG. 4B is a plan view illustrating current flowing through the close-proximity communication coil 151 and the metal plate 111. When a signal current is supplied from a close-proximity communication IC (not shown) in the communication apparatus 15, a current $i_1$ flows in the close-proximity communication coil 151, and an induced current $i_2$ flows in the metal plate 111 and the close-proximity communication coil 121 that are magnetically coupled with the close-proximity communication coil 151. The induced current $i_2$ produced in the metal plate 111 flows so as to encircle a region near the slit portion 125, and flows in the periphery of the metal plate 111 due to a cut-edge effect. A magnetic field is produced by the current $i_1$ flowing in the close-proximity communication coil 151 and the induced current $i_2$ flowing in the metal plate 111 and the close-proximity communication coil 121. This magnetic field passes through the coil opening portions 124 and 154 and the slit portion 125, and spreads widely in the periphery of the metal plate 111. In this manner, a large current loop is generated in the metal plate 111, and the metal plate 111 essentially defines and functions as a radiating element, which extends the distance across which the magnetic field reaches. Accordingly, a greater communication range between the communication terminal 10 and the communication apparatus 15 is achieved.

Although FIG. 4 illustrates a case where the communication terminal 10 operates passively, the communication terminal 10 may operate actively.

Figure 5A:
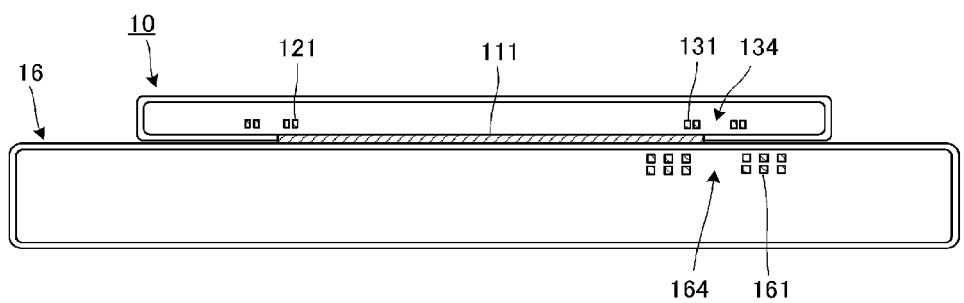
FIG. 5A is a cross-sectional view illustrating the communication terminal according to the first preferred embodiment of the present invention and a power transmitting apparatus.

FIG. 5A is a cross-sectional view illustrating the communication terminal 10 and a power transmitting apparatus 16. The power transmitting apparatus 16 includes a power transmission coil 161. The power transmission coil 161 is a spiral-shaped conductor in which the center of the winding defines and serves as a coil opening portion 164. The communication terminal 10 is disposed upon the power transmitting apparatus 16 so that the coil opening portion 134 and the coil opening portion 164 overlap when viewed from above.

When a high-frequency current flows in the power transmission coil 161, the power transmission coils 131 and 161 and the metal plate 111 magnetically couple with each other. Power is transmitted from the power transmitting apparatus 16 to the communication terminal 10 as a result.

Figure 5B:
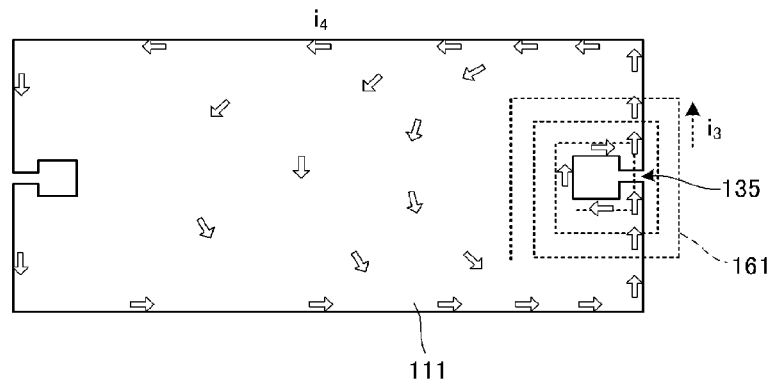
FIG. 5B is a plan view illustrating current flowing through a power transmission coil 161 and the metal plate 111.

FIG. 5B is a plan view illustrating current flowing through the power transmission coil 161 and the metal plate 111. As in the close-proximity communication shown in FIG. 4, when power is supplied from a power transmission IC (not shown) in the power transmitting apparatus 16, a current $i_3$ flows in the power transmission coil 161, and a magnetic field that spreads widely is produced in the periphery of the metal plate 111. A large induced current $i_4$ then flows in the metal plate 111 and the power transmission coil 131 that are magnetically coupled with the power transmission coil 161. The induced current $i_4$ produced in the metal plate 111 flows so as to encircle a region near the slit portion 135, and flows in the periphery of the metal plate 111 due to a cut-edge effect. In this manner, a large current loop is formed in the metal plate 111, and the metal plate 111 essentially defines and functions as a radiating element. The induced current $i_4$ is not easily consumed as eddy current in the metal plate 111. As such, power is efficiently transmitted from the power transmitting apparatus 16 to the communication terminal 10.

Figure 6:
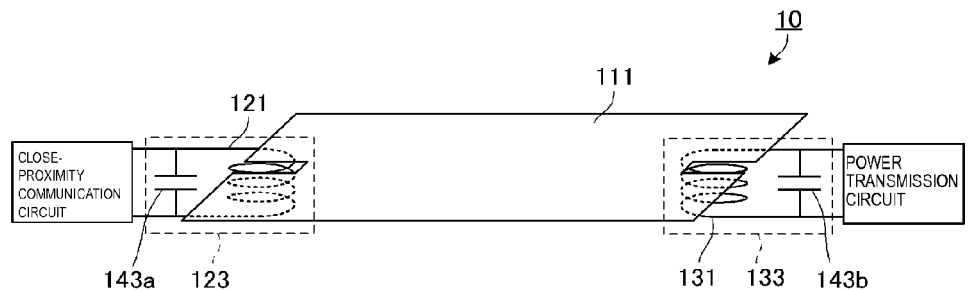
FIG. 6 is a conceptual diagram illustrating the communication terminal according to the first preferred embodiment of the present invention.

FIG. 6 is a conceptual diagram illustrating the communication terminal 10. An LC parallel resonant circuit 123 is connected to the close-proximity communication circuit. The close-proximity communication circuit is configured of the close-proximity communication IC 122 and the like (see FIG. 3A). The LC parallel resonant circuit 123 is configured of the close-proximity communication coil 121 and the capacitor chip 143a (see FIG. 3A). The LC parallel resonant circuit 123 is designed so that the resonant frequency of the LC parallel resonant circuit 123 is almost the same as the frequency used for close-proximity communication, as described above. The frequency used for close-proximity communication preferably is about 13.56 MHz, for example.

An LC parallel resonant circuit 133 is connected to the power transmission circuit. The power transmission circuit is configured of the power transmission IC 132 and the like (see FIG. 3B). The LC parallel resonant circuit 133 is configured of the power transmission coil 131 and the capacitor chip 143b (see FIG. 3B). The LC parallel resonant circuit 133 is configured so that the resonant frequency of the LC parallel resonant circuit 133 is almost the same as the frequency used for power transmission, as described above. The frequency used for power transmission is lower than the frequency used for close-proximity communication, and is about 400 kHz, for example.

The close-proximity communication coil 121, the power transmission coil 131, and the metal plate 111 preferably are disposed as illustrated in FIG. 2.

As described above, the metal plate 111 essentially defines and functions as a radiating element, which extends the communication range during close-proximity communication and increases the efficiency of power transmitted during power transmission. Accordingly, the same antenna characteristics as when the metal plate 111 is not provided, or better antenna characteristics, are ensured even if the sizes of the close-proximity communication coil 121 and the power transmission coil 131 are reduced.

Accordingly, the close-proximity communication coil 121 and the power transmission coil 131 are configured to be smaller than in the past. Accordingly, the distance between the close-proximity communication coil 121 and the power transmission coil 131 is increased. The close-proximity communication coil 121 and the power transmission coil 131 experience almost no magnetic coupling as a result.

Note that the close-proximity communication coil 121 and the power transmission coil 131 preferably are not directly connected (DC). Meanwhile, the metal plate 111 has a lower inductance than the close-proximity communication coil 121 and the power transmission coil 131. As such, the close-proximity communication coil 121 and the power transmission coil 131 experience almost no magnetic coupling via the metal plate 111.

Accordingly, the resonant frequencies of the LC parallel resonant circuits 123 and 133 and so on are prevented from changing due to magnetic coupling. In other words, a change in the electrical characteristics when the close-proximity communication coil 121 and the power transmission coil 131 are disposed within a limited space is prevented.

Note that it is also possible for only one of the close-proximity communication coil 121 and the power transmission coil 131 to magnetically couple with the metal plate 111. Even with such a configuration, the size of one of the coils is still capable of being reduced, and thus the close-proximity communication coil 121 and the power transmission coil 131 are prevented from magnetically coupling with each other.

Figure 7A:
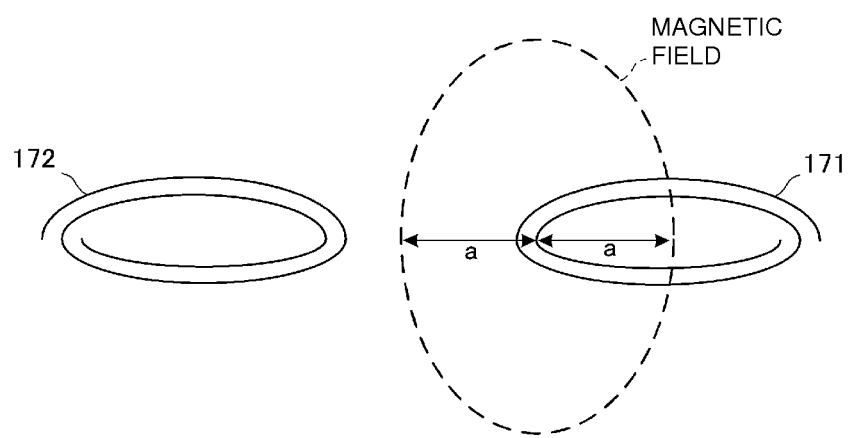
FIG. 7A is a diagram illustrating magnetic coupling between coils.

Next, a guideline for a distance between the close-proximity communication coil 121 and the power transmission coil 131 will be described. FIG. 7A is a diagram illustrating magnetic coupling between coils. When the coil radius of a coil 171 is represented by a, a magnetic field produced by a current flowing in the coil 171 spreads to a location distanced from the center of the coil 171 by approximately 2a. In other words, when a current flows in the coil 171, there is almost no magnetic coupling between the coil 171 and a coil 172 in the case where the coil 172 is distanced from the center of the coil 171 by a distance of greater than or equal to 2a.

Figure 7B:
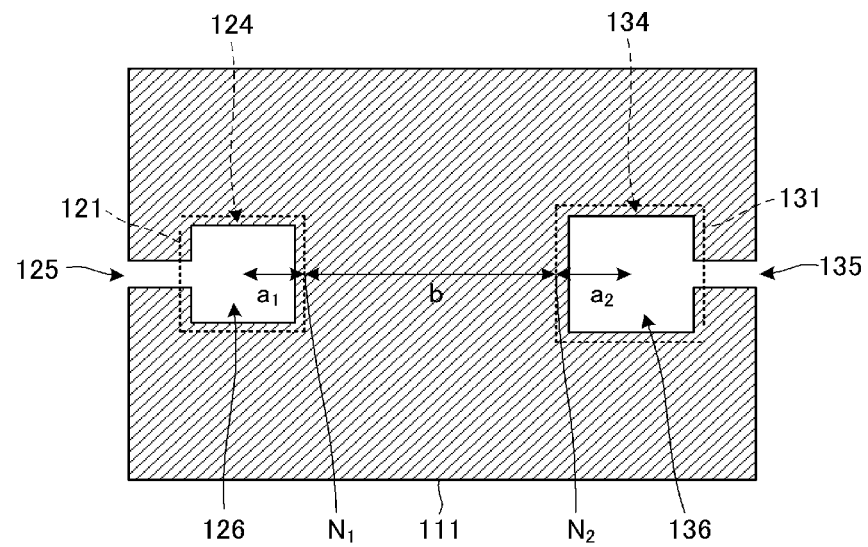
FIG. 7B is a plan view illustrating a guideline for a distance between the close-proximity communication coil 121 and the power transmission coil 131.

FIG. 7B is a plan view illustrating a guideline for a distance between the close-proximity communication coil 121 and the power transmission coil 131. The close-proximity communication coil 121 is disposed along an edge of the metal opening portion 126. The power transmission coil 131 is disposed along an edge of the metal opening portion 136.

A point where a line segment connecting the center of the close-proximity communication coil 121 with the center of the power transmission coil 131 and a conducting wire portion of the close-proximity communication coil 121 intersect is indicated as an intersection point $N_1$. A point where the line segment intersects with a conducting wire portion of the power transmission coil 131 is indicated as an intersection point $N_2$.

A distance between the center of the close-proximity communication coil 121 and the intersection point $N_1$ is represented by a coil radius $a_1$. A distance between the center of the power transmission coil 131 and the intersection point $N_2$ is represented by a coil radius $a_2$. A distance between the intersection point $N_1$ and the intersection point $N_2$ is represented by b. As such, in the case where b is generally greater than or equal to $a_1$ and b is generally greater than or equal to $a_2$, the close-proximity communication coil 121 and the power transmission coil 131 experience almost no magnetic coupling.

Second Preferred Embodiment

Figure 8A:
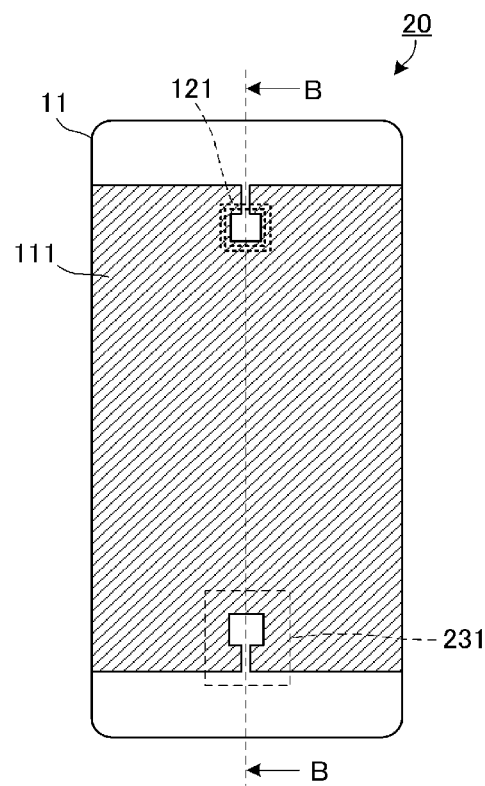
FIG. 8A is a plan view illustrating a rear surface side of a communication terminal according to a second preferred embodiment of the present invention.
Figure 8B:
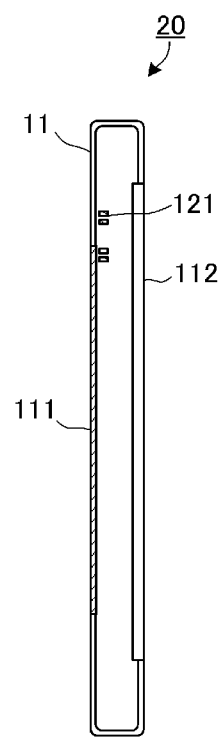
FIG. 8B is a B-B cross-sectional view illustrating the communication terminal according to the second preferred embodiment, of the present invention.
Figure 8C:
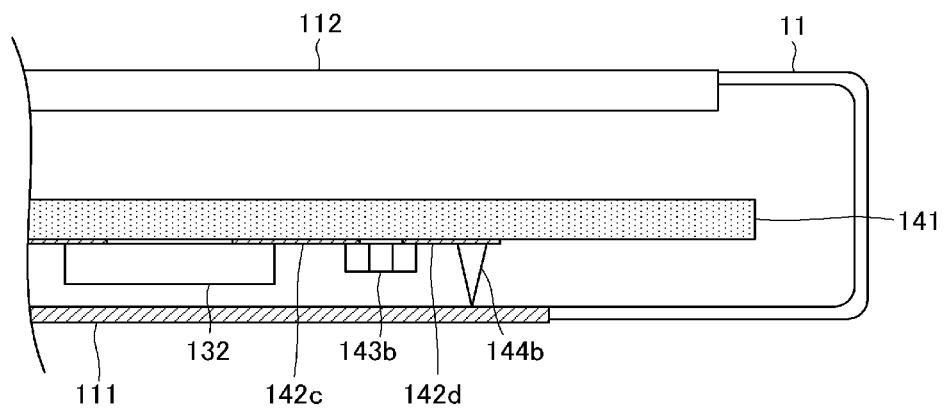
FIG. 8C is a diagram illustrating a power transmission module in the communication terminal according to the second preferred embodiment, showing primary components in an enlarged manner along a B-B cross-section.

A communication terminal 20 according to a second preferred embodiment of the present invention will be described hereinafter. FIG. 8A is a plan view illustrating a rear surface side of the communication terminal 20. FIG. 8B is a B-B cross-sectional view illustrating the communication terminal 20. FIG. 8C is a diagram illustrating a power transmission module in the communication terminal 20, showing primary components in an enlarged manner along the B-B cross-section.

A loop portion 231 is provided in the metal plate 111 preferably by forming a slit having the same shape as the slit portion 135 according to the first preferred embodiment in the metal plate 111. The loop portion 231 configures a power transmission coil.

The communication terminal 20 does not include the power transmission coil 131, the magnetic sheet 145b, or the flexible board 146b according to the first preferred embodiment. Meanwhile, the pin terminal 144b is connected to the metal plate 111.

Other configurations preferably are the same as in the first preferred embodiment.

Figure 9:
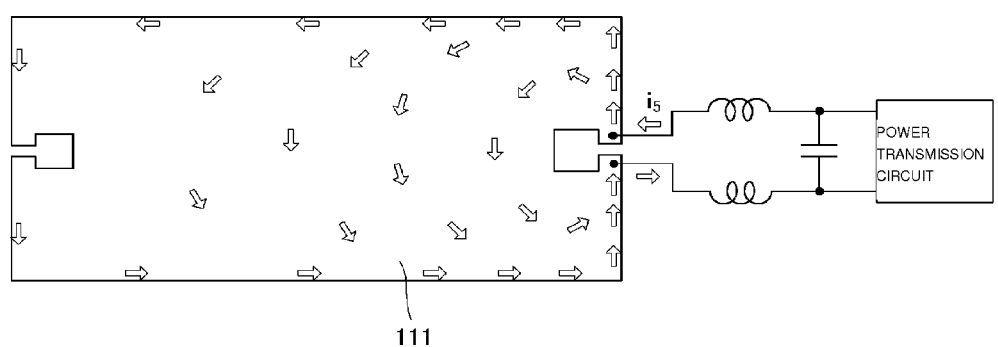
FIG. 9 is a conceptual diagram illustrating the power transmission module in the communication terminal according to the second preferred embodiment of the present invention.

FIG. 9 is a conceptual diagram illustrating the power transmission module in the communication terminal 20. The power transmission circuit is connected to the metal plate 111. As in the first preferred embodiment, when a current flows in the power transmission coil (not shown) of the power transmitting apparatus, an induced current $i_s$ flows in the metal plate 111 that is magnetically coupled with the power transmission coil of the power transmitting apparatus. As such, power is efficiently transmitted to the communication terminal 20.

According to the second preferred embodiment, the power transmission coil and so on are not necessary, and thus the number of components is reduced. In addition, heat is efficiently dissipated through the metal plate 111 during power transmission. The same effects as in the first preferred embodiment are furthermore achieved.

Other Preferred Embodiments

Figure 10A:
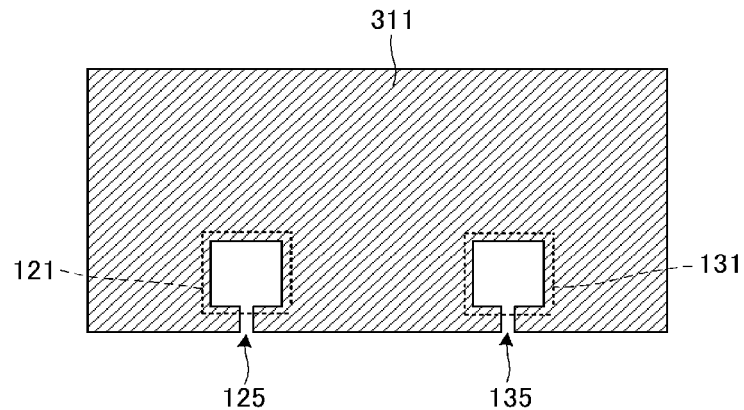
FIGS. 10A, 10B, and 10C are plan views illustrating a metal plate, a close-proximity communication coil, and a power transmission coil according to another preferred embodiment of the present invention.
Figure 10B:
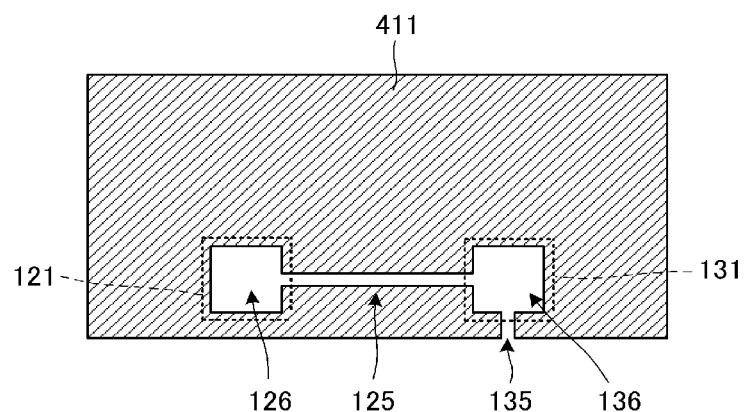
Figure 10C:
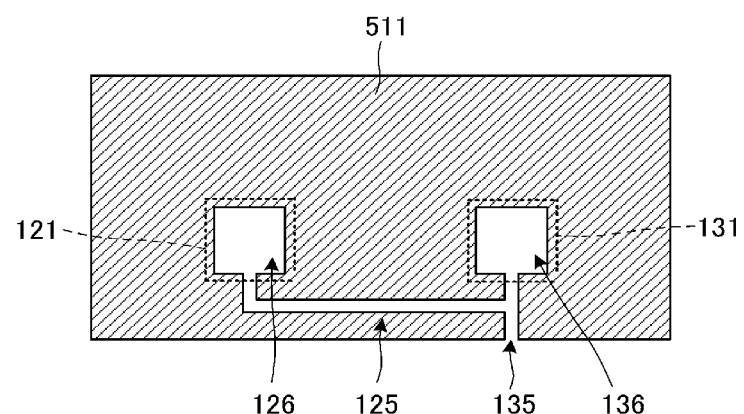

The metal plate, the close-proximity communication coil, and the power transmission coil may be configured as indicated in FIG. 10A, FIG. 10B, and FIG. 10C. These drawings are plan views illustrating the metal plate, the close-proximity communication coil, and the power transmission coil.

A metal plate 311 shown in FIG. 10A is a rectangular or rectangular flat plate. The slit portions 125 and 135 are provided in a first side portion of the metal plate 311 and are disposed so as to be side-by-side along the first side portion.

In a metal plate 411 shown in FIG. 10B, the slit portion 135 having the metal opening portion 136 is provided in an outer edge of the metal plate 411. The slit portion 125 having the metal opening portion 126 is provided in an edge of the metal opening portion 136. In other words, the metal opening portion 126 and the metal opening portion 136 are communicated by a narrow slit.

In a metal plate 511 shown in FIG. 10C, the slit portion 135 including the metal opening portion 136 is provided in an outer edge of the metal plate 511. The slit portion 125 including the metal opening portion 126 is provided in a narrow area of the slit portion 135 (that is, an area that is not the metal opening portion 136). In other words, the metal opening portions 126 and 136 are provided at the ends of respective branches of a narrow slit located in an outer edge of the metal plate 511.

Other configurations, such as the close-proximity communication coil 121, the power transmission coil 131, and so on are preferably the same as in the first preferred embodiment.

The communication terminals according to these preferred embodiments achieve the same effects as in the first preferred embodiment.

Note that the metal plate is not limited to having a rectangular or substantially rectangular plate shape, and may be a metal plate including a curved surface, for example. Likewise, the shape of the metal opening portions is not limited to rectangular or substantially rectangular shapes, and the metal opening portions may be circular or substantially circular, for example. Furthermore, the slit portions, the metal opening portions, and so on are not absolutely necessary.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal comprising:
   a close-proximity communication coil configured to be used in a close-proximity communication system;
   a power transmission coil configured to be used in a contactless power transmission system; and
   a metal plate; wherein
   at least a portion of the metal plate is disposed between the close-proximity communication coil and the power transmission coil when viewed from a direction perpendicular or substantially perpendicular to a main surface of the metal plate;

the close-proximity communication coil and the power transmission coil are disposed in non-overlapping locations when viewed from a direction perpendicular or substantially perpendicular to the main surface of the metal plate;

the close-proximity communication coil is electromagnetically coupled with the metal plate;

a portion of the close-proximity communication coil overlaps with the metal plate when viewed from a direction perpendicular or substantially perpendicular to the main surface of the metal plate;

the metal plate includes a first slit portion; and a coil opening portion of the close-proximity communication coil overlaps with the first slit portion when viewed from a direction perpendicular or substantially perpendicular to the main surface of the metal plate.

2. The communication terminal according to claim 1, wherein the close-proximity communication coil and the power transmission coil are spaced from each other by no less than a coil radius of the close-proximity communication coil and no less than a coil radius of the power transmission coil, when viewed from a direction perpendicular or substantially perpendicular to the main surface of the metal plate.

3. The communication terminal according to claim 1, wherein the close-proximity communication coil and the power transmission coil are disposed in locations facing each other with a central portion of the metal plate located therebetween, when viewed from a direction perpendicular or substantially perpendicular to the main surface of the metal plate.

4. The communication terminal according to claim 1, wherein the communication terminal is a smartphone.

5. The communication terminal according to claim 1, further comprising a camera located at a center or approximate center of a winding of the close-proximity communication coil.

6. A communication terminal comprising:
a close-proximity communication coil configured to be used in a close-proximity communication system;
a power transmission coil configured to be used in a contactless power transmission system; and
a metal plate; wherein
at least a portion of the metal plate is disposed between the close-proximity communication coil and the power transmission coil when viewed from a direction perpendicular or substantially perpendicular to a main surface of the metal plate;
the close-proximity communication coil and the power transmission coil are disposed in non-overlapping locations when viewed from a direction perpendicular or substantially perpendicular to the main surface of the metal plate;
the power transmission coil is electromagnetically coupled with the metal plate;
a portion of the power transmission coil overlaps with the metal plate when viewed from a direction perpendicular or substantially perpendicular to the main surface of the metal plate;
the metal plate includes a second slit portion; and
a coil opening portion of the power transmission coil overlaps with the second slit portion when viewed from a direction perpendicular to the main surface of the metal plate.

7. The communication terminal according to claim 6, wherein the close-proximity communication coil and the power transmission coil are spaced from each other by no less than a coil radius of the close-proximity communication coil and no less than a coil radius of the power transmission coil, when viewed from a direction perpendicular or substantially perpendicular to the main surface of the metal plate.

8. The communication terminal according to claim 6, wherein the close-proximity communication coil and the power transmission coil are disposed in locations facing each other with a central portion of the metal plate located therebetween, when viewed from a direction perpendicular or substantially perpendicular to the main surface of the metal plate.

9. The communication terminal according to claim 6, wherein
a portion of the close-proximity communication coil overlaps with the metal plate when viewed from a direction perpendicular or substantially perpendicular to the main surface of the metal plate; and
the close-proximity communication coil is electromagnetically coupled with the metal plate.

10. The communication terminal according to claim 6, wherein the communication terminal is a smartphone.

11. A communication terminal comprising:
a close-proximity communication coil configured to be used in a close-proximity communication system;
a power transmission coil configured to be used in a contactless power transmission system; and
a metal plate; wherein
at least a portion of the metal plate is disposed between the close-proximity communication coil and the power transmission coil when viewed from a direction perpendicular or substantially perpendicular to a main surface of the metal plate;
the close-proximity communication coil and the power transmission coil are disposed in non-overlapping locations when viewed from a direction perpendicular or substantially perpendicular to the main surface of the metal plate;
the close-proximity communication coil is electromagnetically coupled with the metal plate;
the metal plate includes a loop portion; and
the loop portion configures the power transmission coil.

12. The communication terminal according to claim 11, wherein the close-proximity communication coil and the power transmission coil are spaced from each other by no less than a coil radius of the close-proximity communication coil and no less than a coil radius of the power transmission coil, when viewed from a direction perpendicular or substantially perpendicular to the main surface of the metal plate.

13. The communication terminal according to claim 11, wherein the close-proximity communication coil and the power transmission coil are disposed in locations facing each other with a central portion of the metal plate located therebetween, when viewed from a direction perpendicular or substantially perpendicular to the main surface of the metal plate.

14. The communication terminal according to claim 11, wherein the communication terminal is a smartphone.

15. The communication terminal according to claim 11, further comprising a camera located at a center or approximate center of a winding of the close-proximity communication coil.

16. A communication terminal comprising:
a close-proximity communication coil configured to be used in a close-proximity communication system;

a power transmission coil configured to be used in a contactless power transmission system;

a metal plate; and a housing that is partially configured of the metal plate; wherein at least a portion of the metal plate is disposed between the close-proximity communication coil and the power transmission coil when viewed from a direction perpendicular or substantially perpendicular to a main surface of the metal plate;

the close-proximity communication coil and the power transmission coil are disposed in non-overlapping locations when viewed from a direction perpendicular or substantially perpendicular to the main surface of the metal plate; and at least one of the close-proximity communication coil and the power transmission coil is electromagnetically coupled with the metal plate.

17. The communication terminal according to claim 16, wherein the close-proximity communication coil and the power transmission coil are spaced from each other by no less than a coil radius of the close-proximity communication coil and no less than a coil radius of the power transmission coil, when viewed from a direction perpendicular or substantially perpendicular to the main surface of the metal plate.

18. The communication terminal according to claim 16, wherein the close-proximity communication coil and the power transmission coil are disposed in locations facing each other with a central portion of the metal plate located therebetween, when viewed from a direction perpendicular or substantially perpendicular to the main surface of the metal plate.

19. The communication terminal according to claim 16, wherein a portion of the close-proximity communication coil overlaps with the metal plate when viewed from a direction perpendicular or substantially perpendicular to the main surface of the metal plate; and the close-proximity communication coil is electromagnetically coupled with the metal plate.

20. The communication terminal according to claim 16, wherein the communication terminal is a smartphone.

* * * * *